(12) United States Patent
Yuasa et al.

(10) Patent No.: US 7,247,662 B2
(45) Date of Patent: Jul. 24, 2007

(54) CEMENT DISPERSANT, ITS PRODUCTION PROCESS, AND CEMENT COMPOSITION USING THE CEMENT DISPERSANT

(75) Inventors: Tsutomu Yuasa, Osaka (JP); Noboru Sakamoto, Suita (JP); Tsuyoshi Hirata, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 11/137,228

(22) Filed: May 25, 2005

(65) Prior Publication Data

US 2005/0222301 A1    Oct. 6, 2005

Related U.S. Application Data

(62) Division of application No. 10/266,129, filed on Oct. 7, 2001, now Pat. No. 6,946,505.

(30) Foreign Application Priority Data

Oct. 17, 2001    (JP)    ............... 2001-319828

(51) Int. Cl.
   *C08K 3/00*    (2006.01)
(52) U.S. Cl. ............... 524/4; 524/5; 524/556; 524/558; 526/79; 526/240; 526/318.41
(58) Field of Classification Search ............... 524/4, 524/5, 556, 558; 526/79, 240, 318.41
   See application file for complete search history.

(56) References Cited

U.S. PATENT DOCUMENTS

| | | | |
|---|---|---|---|
| 4,668,820 A | 5/1987 | Ibata et al. | |
| 5,319,424 A | 6/1994 | Tomiyama et al. | |
| 5,912,284 A | 6/1999 | Hirata et al. | |
| 6,143,832 A | 11/2000 | Toyoshima et al. | |
| 6,162,873 A | 12/2000 | Toyoshima et al. | |
| 6,187,841 B1 | 2/2001 | Tanaka et al. | |
| 6,376,581 B1 | 4/2002 | Tanaka et al. | |
| 6,388,038 B1 | 5/2002 | Hirata et al. | |
| 6,486,260 B1 | 11/2002 | Yuasa et al. | |
| 6,545,083 B1 * | 4/2003 | Hirata et al. | 524/556 |
| 6,569,234 B2 | 5/2003 | Yamashita et al. | |
| 6,727,315 B2 | 4/2004 | Yamamoto et al. | |
| 6,756,471 B1 | 6/2004 | Kroner et al. | |

FOREIGN PATENT DOCUMENTS

| | | |
|---|---|---|
| CA | 1 258 947 A1 | 8/1989 |
| CN | 85 1 01102 A | 1/1987 |
| EP | 0 141 327 B1 | 5/1985 |
| EP | 0 303 747 A2 | 2/1989 |
| EP | 0 725 044 A1 | 8/1996 |
| EP | 0 850 895 A1 | 7/1998 |
| GB | 2 280 180 A | 1/1995 |
| JP | 59-18338 B | 4/1984 |
| JP | 3-278067 A | 12/1991 |
| JP | 7-157555 A | 6/1995 |
| JP | 9-86990 A | 3/1997 |
| JP | 10-236858 A | 9/1998 |
| JP | 2000-327388 A | 11/2000 |
| JP | 2001-2734 A | 1/2001 |
| JP | 2001-87640 A | 4/2001 |
| JP | 2001-130937 A | 5/2001 |
| WO | WO 95/16643 A1 | 6/1995 |
| WO | WO 97/48656 A1 | 12/1997 |
| WO | WO 01/40338 A1 | 6/2001 |

* cited by examiner

*Primary Examiner*—Robert D. Harlan

(57) ABSTRACT

Disclosed are the following: a cement dispersant which is excellent in initial dispersibility and further in flow retainability of cement, because of using a polymer having a proper molecular weight distribution; a process for producing this cement dispersant; and a cement composition using this cement dispersant. The cement dispersant comprises a water-soluble polymer (P) as a main component, and is characterized by displaying an area proportion (a value (A–B) given by subtracting an area ratio B of a lower molecular weight side portion from an area ratio A of a higher molecular weight side portion) in the range of 13 to 60%.

9 Claims, 1 Drawing Sheet

CEMENT DISPERSANT, ITS PRODUCTION PROCESS, AND CEMENT COMPOSITION USING THE CEMENT DISPERSANT

This is a divisional of U.S. patent application Ser. No. 10/266,129 filed Oct. 7, 2002 (now U.S. Pat. No. 6,946,505 issued Sep. 20, 2005) and claims the benefit thereof under 35 U.S.C. § 120.

BACKGROUND OF THE INVENTION

A. Technical Field

The present invention relates to a cement dispersant, its production process, and a cement composition using the cement dispersant. More specifically, the invention relates to: a cement dispersant which is excellent in initial dispersibility and further in flow retainability of cement; a process for producing this cement dispersant; and a cement composition using this cement dispersant.

B. Background Art

Cement is often used in civil engineering and building sites. Cement paste (obtained by adding water to cement), mortar (obtained by mixing the cement paste with sand as fine aggregate), and concrete (obtained by further mixing the mortar with ballast as coarse aggregate) are used for many purposes such as structural materials, civil engineering, and fire walls, and their quantities are also large. As to these cement paste, mortar, and concrete, their strength is produced via cohesion and hardening by hydration reaction between cement and water, so the workability becomes worse with the passage of time after the addition of water. Particularly, since early deterioration of concrete structures became social problems in 1981, it has been strongly required to improve execution and durability of the concrete structures by decreasing the unit quantity of water in concrete. Thus, technological innovation is carried out to cement additives which have much influence on the quality and the performance of cement compositions.

Various cement additives, such as naphthalenic, aminosulfonic, and polycarboxylic ones, have hitherto been developed, and those which are known as excellent polycarboxylic high-performance water-reducing agents are as follows: a copolymer obtained by copolymerizing such as a polyalkylene glycol mono(meth)acrylic acid esteric monomer and a (meth)acrylic monomer in a specific ratio as disclosed in JP-B-018338/1984; and a copolymer obtained by copolymerizing such as an unsaturated polyalkylene glycol etheric monomer and a maleic monomer in a specific ratio as disclosed in JP-A-236858/1998.

These polycarboxylic high-performance AE water-reducing agents have high water reducibility and slump retainability, but these performances are not yet sufficiently satisfiable, therefore more improvement of these performances is demanded.

Generally, performances of cement dispersants correlate with molecular weights of polymers as used. In the case where the molecular weight is small, the dispersibility, particularly, initial dispersibility, is excellent, but there are also problems in that the quantity of air becomes excessive. On the other hand, in the case where the molecular weight is large, the flow retainability of cement is excellent, but there are also problems in that addition of a large quantity of cement dispersant becomes necessary for obtaining the same flow value.

SUMMARY OF THE INVENTION

A. Object of the Invention

Thus, an object of the present invention is to solve the above problems and to provide: a cement dispersant which is excellent in initial dispersibility and further in flow retainability of cement, because of using a polymer having a proper molecular weight distribution; a process for producing this cement dispersant; and a cement composition using this cement dispersant.

B. Disclosure of the Invention

For the purpose of solving the above problems, a cement dispersant according to the present invention comprises a water-soluble polymer (P) as a main component, and is characterized by displaying an area proportion in the range of 13 to 60% wherein the area proportion is defined by a measurement process including the following steps (1) to (9) of:

(1) measuring a weight-average molecular weight of the water-soluble polymer (P) by gel permeation chromatography (GPC);

(2) detecting a height (H) of the top peak of the resultant GPC chart;

(3) representing a value of a weight-average molecular weight indicating a height (½H) of ½ of the height of the top peak on the higher molecular weight side of the top peak by $M_A$;

(4) measuring an area ($A_0$) of a higher molecular weight side portion than the weight-average molecular weight $M_A$ of the resultant GPC chart;

(5) representing a value of a weight-average molecular weight indicating a height (½H) of ½ of the height of the top peak on the lower molecular weight side of the top peak by $M_B$;

(6) measuring an area ($B_0$) of a lower molecular weight side portion than the weight-average molecular weight $M_B$ of the resultant GPC chart;

(7) defining an area ratio A of the higher molecular weight side portion as $A=(A_0\times100)/(A_0+B_0)$;

(8) defining an area ratio B of the lower molecular weight side portion as $B=(B_0\times100)/(A_0+B_0)$; and (9) defining a value (A−B), given by subtracting the area ratio B of the lower molecular weight side portion from the area ratio A of the higher molecular weight side portion, as the area proportion (%).

In addition, a process for producing a cement dispersant, according to the present invention, is a process for producing a cement dispersant including a water-soluble polymer (P) as a main component, and is characterized by comprising the step of polymerizing a monomer component, including an unsaturated carboxylic monomer as an essential component, in the presence of a polymerization initiator and/or a chain transfer agent, wherein the polymerizing step includes the steps of:

a main-polymer production step of polymerizing a part of the monomer component, thereby producing a polymer (P1) constituting 60 to 99 mass % of the water-soluble polymer (P); and a step of producing a polymer for adjustment of higher molecular components, which is a step of polymerizing a part of the monomer component, thereby producing a polymer (P2) constituting 1 to 40 mass % of the water-soluble polymer (P) and having a higher weight-average molecular weight than the polymer (P1) as obtained in the main-polymer production step.

These and other objects and the advantages of the present invention will be more fully apparent from the following detailed disclosure.

DETAILED DESCRIPTION OF THE INVENTION

Figure 1:
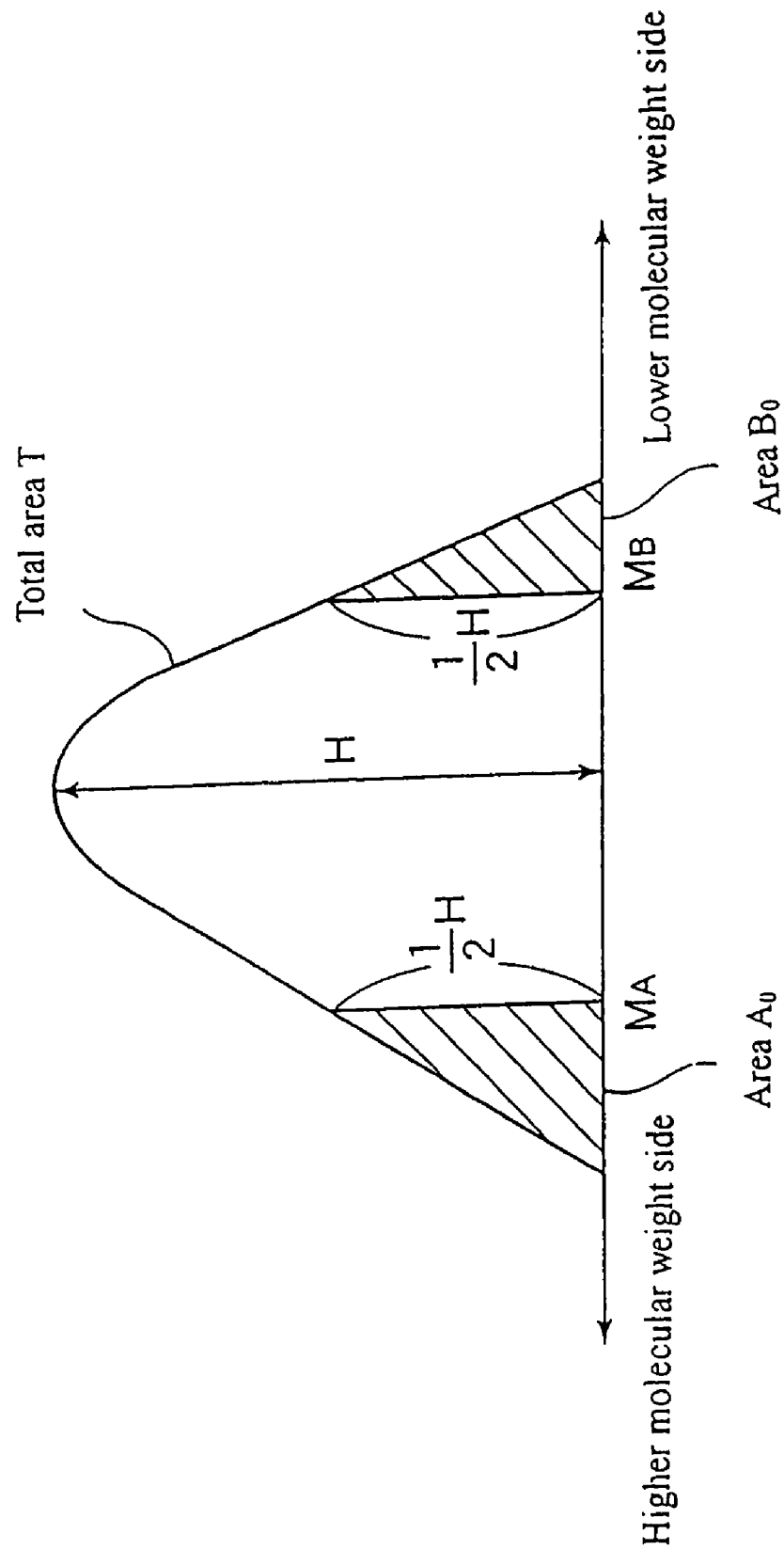
FIG. 1 is a chart for explaining the area proportion defined in the present invention.

Hereinafter, the present invention is described in detail.

The water-soluble polymer (P), used as the main component of the cement dispersant according to the present invention, involves possession of a hydrophilic structural unit in a quantity sufficient for the polymer to be water-soluble. Examples of the hydrophilic structural unit include anionic, nonionic, and cationic structural units, and these structural units may be possessed either alone respectively or in combinations with each other. Favorable for being excellent as a cement dispersant are those which have both anionic and nonionic groups, and further, if necessary, a cationic group, as the hydrophilic structural units.

Examples of the anionic group include a carboxyl group, a sulfonic acid group, a phosphoric acid group, a carbonic acid group, a silicic acid group, and a nitric acid group, and these anionic groups can be possessed either alone respectively or in combinations with each other, but it is the most favorable to essentially have the carboxyl group, and it is favorable to further have the sulfonic acid group, if necessary.

Examples of the nonionic group include an (alkoxy)(poly) alkylene glycol residue and an alkyl ether group, and these nonionic groups can be possessed either alone respectively or in combinations with each other, but it is favorable to essentially have an (alkoxy)polyalkylene glycol residue, and above all, it is more favorable to have an polyethylene glycol residue and/or an alkoxypolyethylene glycol residue.

Examples of the cationic group include an amino group, an amide group, a polyalkylenepolyamine residue, a polyamidopolyamine, or residues of their alkylene oxide addition products, and these cationic groups can be possessed either alone respectively or in combinations with each other, but it is favorable to have the residue of polyalkylenepolyamine or its alkylene oxide addition product and the residue of polyamidopolyamine or its alkylene oxide addition product.

The anionic group is favorably present in a quantity of 0.1 to 13.0 mq/g, more favorably 0.2 to 10.0 mq/g, still more favorably 0.5 to 5.0 mq/g, based on 1 g (in terms of solid content) of the water-soluble polymer, and it is favorable that the carboxyl group content satisfies these ranges.

The measurement of the carboxyl group content of the water-soluble polymer can be carried out in the following way. Specifically, in the following way, the carboxyl group content can be determined from the quantity of NaOH (sodium hydroxide) necessary from a first inflection point to a second inflection point in carrying out potentiometric titration of an aqueous polymer solution as adjusted to not more than 2 in pH.

(Process for Measurement of Carboxyl Group Content of Water-Soluble Polymer (Potentiometric Titration))
1. A quantity of 0.5 g of polymer is dissolved into 50 ml of water.
2. The pH of the resultant aqueous polymer solution is adjusted to not more than 2 with a 0.1 N aqueous hydrochloric acid solution.
3. Potentiometric titration is carried out with a 1 N aqueous sodium hydroxide (NaOH) solution.
4. The carboxylic acid value (mq/g) of the polymer is calculated from the accurate mass of the polymer and the quantity of NaOH necessary from a first inflection point to a second inflection point.
   First inflection point: inflection point at which the hydrochloric acid is neutralized.
   Second inflection point: inflection point at which the carboxylic acid is neutralized.

The nonionic group is favorably present in a quantity of 1 to 95 mass %, more favorably 30 to 95 mass %, still more favorably 40 to 95 mass %, based on the water-soluble polymer, and it is favorable that the (alkoxy)polyalkylene glycol residue content satisfies these ranges.

The measurement of the (alkoxy)polyalkylene glycol residue content of the water-soluble polymer can be carried out in the following way, and particularly the measurement of the (alkoxy)polyethylene glycol residue content is favorably carried out in the following way.

(Process for Measurement of (Alkoxy)Polyalkylene Glycol Content of Water-Soluble Polymer):
1. A calibration curve (mass ratio and integrated area ratio of H-NMR) of a standard substance and the (alkoxy)polyalkylene glycol is drawn.
2. The polymer and the internal standard substance are homogeneously mixed together to measure H-NMR of the resultant mixture.
3. The mass of a "peak of 3.3 to 3.9 ppm appearing in the same position as of the (alkoxy)polyalkylene glycol" is calculated from the calibration curve on the basis of an area proportion between integrated values of the "peak of 3.3 to 3.9 ppm appearing in the same position as of the (alkoxy)polyalkylene glycol" and of a "peak of the internal standard substance".

The cationic group is favorably present in a quantity of 0.1 to 13.0 mq/g based on the water-soluble polymer.

Although there is no especial limitation on the above water-soluble polymer (P) if it can display water reducibility to cement compositions, yet it is favorable to use a polycarboxylic polymer having a polyalkylene glycol in its side chains. Such a polycarboxylic polymer can be made an essential component of the cement dispersant, and is called polycarboxylic polymer cement dispersant or water-reducing agent.

Favorable as the above polycarboxylic polymer is a polycarboxylic polymer (P-1) having:
a polyoxyalkylene esteric constitutional unit (I) of the following general formula (1):

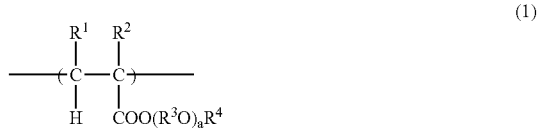

(1)

(wherein: $R^1$ and $R^2$, being identical with or different from each other, represent a hydrogen atom or a methyl group; $R^3O$, being identical with or different from each other, represents an oxyalkylene group having 2 to 18 carbon atoms; "a" represents a molar-number-average degree of addition polymerization of the oxyalkylene group and is a number of 2 to 300; and $R^4$ represents a hydrogen atom or a hydrocarbon group having 1 to 30 carbon atoms); and a carboxylic constitutional unit (II) of the following general formula (2):

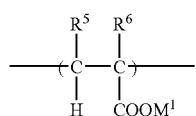

(wherein: $R^5$ and $R^6$, being identical with or different from each other, represent a hydrogen atom or a methyl group; and $M^1$ represents a hydrogen atom, a monovalent metal, a divalent metal, ammonium, or an organic amine).

In addition, favorable as the above polycarboxylic polymer is a polycarboxylic polymer (P-2) having:

a polyoxyalkylene etheric constitutional unit (III) of the following general formula (3):

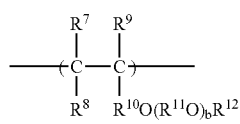

(wherein: $R^7$, $R^8$, and $R^9$, being identical with or different from each other, represent a hydrogen atom or a methyl group; $R^{10}$ represents a hydrocarbon group having 1 to 5 carbon atoms; $R^{11}O$, being identical with or different from each other, represents an oxyalkylene group having 2 to 18 carbon atoms; "b" represents a molar-number-average degree of addition polymerization of the oxyalkylene group and is a number of 2 to 300; and $R^{12}$ represents a hydrogen atom or a hydrocarbon group having 1 to 30 carbon atoms); and a carboxylic constitutional unit (IV) of the following general formula (4):

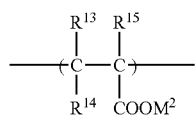

(wherein: $R^{13}$ and $R^{14}$, being identical with or different from each other, represent a hydrogen atom, a methyl group, or —COOM$^3$ wherein $R^{13}$ and $R^{14}$ do not represent —COOM$^3$ at the same time; $R^{15}$ represents a hydrogen atom, a methyl group, or —CH$_2$COOM$^4$ wherein, when $R^{15}$ is —CH$_2$COOM$^4$, then $R^{13}$ and $R^{14}$, being identical with or different from each other, represent a hydrogen atom or a methyl group; and $M^2$, $M^3$, and $M^4$ represent a hydrogen atom, a monovalent metal, a divalent metal, ammonium, or an organic amine).

In other words, the above water-soluble polymer (P) favorably includes the above polycarboxylic polymer (P-1) and/or the above polycarboxylic polymer (P-2). Such a water-soluble polymer (P) may either be composed of the above polycarboxylic polymer(s) alone or further include another component, but favorably includes the polycarboxylic polymer(s) as the main component(s).

The above polycarboxylic polymers (P-1) and (P-2) are characterized by having the above essential constitutional units (repeating units) and may further have a constitutional unit (V) as derived from the below-mentioned monomer (e). These constitutional units may be used either alone respectively or in combinations with each other.

The above polycarboxylic polymer (P-1) can be produced by a process including the step of copolymerizing monomer components including a monomer to give the constitutional unit (I) (for example, the below-mentioned monomer (a)) and a monomer to give the constitutional unit (II) (for example, the below-mentioned monomer (b)) as essential components. Such monomer components may further include a monomer to give the constitutional unit (V) (for example, the below-mentioned monomer (e)). Incidentally, in the case where the number of kinds is one as to any of these constitutional units, it is enough to use one kind of monomer to give the corresponding constitutional unit, and in the case where the number of kinds is at least two as to any of these constitutional units, it is enough to use at least two kinds of monomers to give the corresponding constitutional units.

The ratio between the constitutional units constituting the above polycarboxylic polymer (P-1) is favorably in the range of constitutional unit (I)/constitutional unit (II)/constitutional unit (V)=(1 to 99)/(99 to 1)/(0 to 50), more favorably (50 to 99)/(50 to 1)/(0 to 49), still more favorably (60 to 95)/(40 to 5)/(0 to 30), most favorably (70 to 95)/(30 to 5)/(0 to 10), in mass ratio wherein the total of the constitutional units (I), (II) and (V) is 100 mass %.

The above polycarboxylic polymer (P-1) may be produced by a process including the steps of: polymerizing a monomer component including a monomer to give the constitutional unit (II) (for example, the below-mentioned monomer (b)) as an essential component; and then directly esterifying at least a part of carboxyl groups of the resultant polymer with an alkoxypolyalkylene glycol.

Examples of the hydrocarbon group having 1 to 30 carbon atoms as $R^4$ in the above general formula (1) include: alkyl groups having 1 to 30 carbon atoms; benzene-ring-containing aromatic groups having 6 to 30 carbon atoms, such as a phenyl group, alkylphenyl groups, phenylalkyl groups, (alkyl)phenyl-group-substituted phenyl groups, and a naphthyl group; and alkenyl groups having 2 to 30 carbon atoms. In addition, the "a", which represents a molar-number-average degree of addition polymerization of the oxyalkylene group, is a number of 2 to 300, but favorably 5 to 300, more favorably 10 to 250, still more favorably 15 to 250, most favorably 20 to 200. Furthermore, the number of carbon atoms of $R^4$ is favorably in the range of 1 to 22, more favorably 1 to 18, still more favorably 1 to 12, and further, particularly favorably 1 to 6, more particularly favorably 1 to 5, most favorably 1 to 3.

The number of carbon atoms of the oxyalkylene group $R^3O$ in the above general formula (1) is properly in the range of 2 to 18, but favorably 2 to 8, more favorably 2 to 4. In addition, in the case where only one kind is used as the constitutional unit (I), it is favorable for ensuring a balance between hydrophilicity and hydrophobicity that the oxyethylene group is indispensably included in the oxyalkylene groups, more favorably in a ratio of not less than 50 mol %, particularly favorably not less than 60 mol %. On the other hand, in the case where at least two kinds are used as the constitutional unit (I), it is favorable that at least any one kind of the constitutional units (I) indispensably includes the oxyethylene group in the oxyalkylene groups.

Examples of the monomer (a) to give the above constitutional unit (I) include: addition products obtained by addition reactions of alkylene oxides having 2 to 18 carbon atoms to (meth)acrylic acid, crotonic acid, or products obtained by dehydrogenation (oxidation) reactions of fatty acids; and compounds obtained by esterification of alkoxypolyalkylene glycols with (meth)acrylic acid or crotonic acid, wherein the alkoxypolyalkylene glycols are obtained by addition reactions of alkylene oxides having 2 to 18 carbon atoms to any of the following alcohols: saturated aliphatic alcohols having 1 to 30 carbon atoms, such as methanol, ethanol, 2-propanol, 1-butanol, 1-pentanol, 1-hexanol, octanol, 2-ethyl-1-hexanol, nonyl alcohol, lauryl alcohol, cetyl alcohol, and stearyl alcohol; unsaturated aliphatic alcohols having 3 to 30 carbon atoms, such as allyl alcohol, methallyl alcohol, crotyl alcohol, and oleyl alcohol; alicyclic alcohols having 3 to 30 carbon atoms, such as cyclohexanol; and aromatic alcohols having 6 to 30 carbon atoms, such as phenol, phenylmethanol (benzyl alcohol), methylphenol (cresol), p-ethylphenol, dimethylphenol (xylenol), p-t-butylphenol, nonylphenol, dodecylphenol, phenylphenol, and naphthol. However, favorable are the compounds obtained by esterification of the alkoxypolyalkylene glycols with (meth)acrylic acid or crotonic acid, corresponding to the case where $R^4$ in the general formula (1) is the hydrocarbon group.

Examples of specific chemical names of the above monomer (a) include the following:

various alkoxypolyethylene glycol mono(meth)acrylates such as methoxypolyethylene glycol mono(meth)acrylate, ethoxypolyethylene glycol mono(meth)acryl ate, 1-propoxypolyethylene glycol mono(meth)acrylate, 2-propoxypolyethylene glycol mono(meth)acrylate, 1-butoxypolyethylene glycol mono(meth)acrylate, 2-butoxypolyethylene glycol mono(meth)acrylate, 2-methyl-1-propoxypolyethylene glycol mono(meth)acrylate, 2-methyl-2-propoxypolyethylene glycol mono(meth)acrylate, 1-pentoxypolyethylene glycol mono(meth)acrylate, 1-hexoxypolyethylene glycol mono(meth)acrylate, cyclohexoxypolyethylene glycol mono(meth)acrylate, 1-octoxypolyethylene glycol mono(meth)acrylate, 2-ethyl-1-hexoxypolyethylene glycol mono(meth)acrylate, nonylalkoxypolyethylene glycol mono(meth)acrylates, laurylalkoxypolyethylene glycol mono(meth)acrylates, cetylalkoxypolyethylene glycol mono(meth)acrylates, stearylalkoxypolyethylene glycol mono(meth)acrylates, phenoxypolyethylene glycol mono(meth)acrylate, phenylmethoxypolyethylene glycol mono(meth)acrylate, methylphenoxypolyethylene glycol mono(meth)acrylate, p-ethylphenoxypolyethylene glycol mono(meth)acrylate, dimethylphenoxypolyethylene glycol mono(meth)acrylate, p-t-butylphenoxypolyethylene glycol mono(meth)acrylate, nonylphenoxypolyethylene glycol mono(meth)acrylate, dodecylphenoxypolyethylene glycol mono(meth)acrylate, phenylphenoxypolyethylene glycol mono(meth)acrylate, naphthoxypolyethylene glycol mono(meth)acrylate, products obtained by esterification of ethylene-oxide-added (meth)allyl alcohol with (meth)acrylic acid, and products obtained by esterification of ethylene-oxide-added crotyl alcohol with (meth)acrylic acid, various alkoxypolypropylene glycol mono(meth)acrylates such as metlioxypolypropylene glycol mono(meth)acrylate, ethoxypolypropylene glycol mono(meth)acrylate, 1-propoxypolypropylene glycol mono(meth)acrylate, 2-propoxypolypropylene glycol mono(meth)acrylate, 1-butoxypolypropylene glycol mono(meth)acrylate, products obtained by esterification of propylene-oxide-added (meth)allyl alcohol with (meth)acrylic acid, and products obtained by esterification of propylene-oxide-added crotyl alcohol with (meth)acrylic acid; and various alkoxypolyalkylene glycol mono(meth)acrylates such as methoxypolyethylenepolypropylene glycol mono(meth)acrylate, methoxypolyethylenepolybutylene glycol mono(meth)acrylate, ethoxypolyethylenepolypropylene glycol mono(meth)acrylate, ethoxypolyethylenepolybutylene glycol mono(meth)acrylate, 1-propoxypolyethylenepolypropylene glycol mono(meth)acrylate, 1-propoxypolyethylenepolybutylene glycol mono(meth)acrylate, 2-propoxypolyethylenepolypropylene glycol mono(meth)acrylate, 2-propoxypolyethylenepolybutylene glycol mono(meth)acrylate, 1-butoxypolyethylenepolypropylene glycol mono(meth)acrylate, 1-butoxypolyethylenepolybutylene glycol mono(meth)acrylate, and products obtained by esterification of at-least-two-alkylene-oxides-added alcohols with (meth)acrylic acid (e.g. products obtained by esterification of ethylene-oxide-and-propylene-oxide-added or ethylene-oxide-and-butylene-oxide-added (meth)allyl alcohol with (meth)acrylic acid, and products obtained by esterification of ethylene-oxide-and-propylene-oxide-added or ethylene-oxide-and-butylene-oxide-added crotyl alcohol with (meth) acrylic acid).

Examples of the monomer (b) to give the constitutional unit (II) of the above general formula (2) include acrylic acid, methacrylic acid, crotonic acid, and their metal salts, ammonium salts, and amine salts. Particularly, (meth)acrylic acid and their salts are favorable.

The above polycarboxylic polymer (P-2) can be produced by a process including the step of copolymerizing monomer components including a monomer to give the constitutional unit (III) (for example, the below-mentioned monomer (c)) and a monomer to give the constitutional unit (IV) (for example, the below-mentioned monomer (d)) as essential components. Such monomer components may further include a monomer to give the constitutional unit (V) (for example, the below-mentioned monomer (e)).

The ratio between the constitutional units constituting the above polycarboxylic polymer (P-2) is favorably in the range of constitutional unit (III)/constitutional unit (IV)/constitutional unit (V)=(1 to 99)/(99 to 1)/(0 to 50), more favorably (50 to 99)/(50 to 1)/(0 to 49), still more favorably (60 to 95)/(40 to 5)/(0 to 30), most favorably (70 to 95)/(30 to 5)/(0 to 10), in mass ratio wherein the total of the constitutional units (III), (IV) and (V) is 100 mass %.

The above polycarboxylic polymer (P-2) may be produced by a process including the steps of: copolymerizing monomer components including an unsaturated alcohol, such as allyl alcohol, methallyl alcohol, 3-methyl-3-buten-1-ol, 3-methyl-2-buten-1-ol, or 2-methyl-3-buten-2-ol, and a monomer to give the constitutional unit (IV) (for example, the below-mentioned monomer (d)) as essential components; and then causing 2 to 300 mols on average of an alkylene oxide to add to the resultant polymer or causing the resultant polymer to react with an alkoxypolyalkylene glycol of 2 to 300 in molar-number-average degree of addition polymerization.

In the above general formula (3), the "b", which represents a molar-number-average degree of addition polymerization of the oxyalkylene group, is a number of 2 to 300, but favorably 5 to 300, more favorably 10 to 250, still more favorably 15 to 250, particularly favorably 20 to 200. In addition, $R^{12}$ is favorably a hydrogen atom and, in the case where $R^{12}$ is a hydrocarbon group, its number of carbon atoms is favorably in the range of 1 to 22, more favorably 1 to 18, still more favorably 1 to 12, and further, particularly favorably 1 to 6, more particularly favorably 1 to 5, most favorably 1 to 3. Furthermore, the number of carbon atoms of $R^{10}$ is in the range of 1 to 5, but favorably 1 to 4, more favorably 1 to 3, and $R^{10}$ particularly favorably has such a structure as —$CH_2$—, —$(CH_2)_2$—, or —$C(CH_3)_2$—.

The number of carbon atoms of the oxyalkylene group $R^{11}O$ in the above general formula (3) is properly in the range of 2 to 18, but favorably 2 to 8, more favorably 2 to 4. In addition, in the case where only one kind is used as the constitutional unit (III), it is favorable for ensuring a balance between hydrophilicity and hydrophobicity that the oxyethylene group is indispensably included in the oxyalkylene groups, more favorably in a ratio of not less than 50 mol %, particularly favorably not less than 60 mol %.

Examples of the monomer (d) to give the constitutional unit (IV) of the above general formula (4) include: unsaturated monocarboxylic monomers, such as acrylic acid, methacrylic acid, crotonic acid, and their metal salts, ammonium salts, and amine salts; and unsaturated dicarboxylic monomers, such as maleic acid, itaconic acid, citraconic acid, fumaric acid, and their metal salts, ammonium salts, and amine salts. Furthermore, their anhydrides are also usable, and examples thereof include maleic anhydride, itaconic anhydride, and citraconic anhydride. Particularly, it is favorable to use (meth)acrylic acid, maleic acid, maleic anhydride, and their salts.

With regard to the monomer (e) to give the constitutional unit (V), usable in the present invention, there is no especial limitation if this monomer is copolymerizable with at least one of the other monomers. Examples thereof include the following:

half esters and. diesters of unsaturated dicarboxylic acids, such as maleic acid, fumaric acid, itaconic acid, and citraconic acid, with alcohols having 1 to 30 carbon atoms; half amides and diamides of the aforementioned unsaturated dicarboxylic acids with amines having 1 to 30 carbon atoms; half esters and diesters of the aforementioned unsaturated dicarboxylic acids with alkyl (poly)alkylene glycols as obtained by addition reactions of 1 to 500 mols of alkylene oxides having 2 to 18 carbon atoms to the aforementioned alcohols or amines; half esters and diesters of the aforementioned unsaturated dicarboxylic acids with glycols having 2 to 18 carbon atoms or with polyalkylene glycols of 2 to 300 in molar-number-average degree of addition polymerization of the foregoing glycols;

half amides of maleamic acid with glycols having 2 to 18 carbon atoms or with polyalkylene glycols of 2 to 300 in molar-number-average degree of addition polymerization of the foregoing glycols; (poly)alkylene glycol di(meth)acrylates such as triethylene glycol di(meth)acrylate, (poly)ethylene glycol di(meth)acrylate, (poly)propylene glycol di(meth)acrylate, and (poly)ethylene glycol (poly)propylene glycol di(meth)acrylate; polyfunctional (meth)acrylates such as hexanediol di(meth)acrylate, trimethylolpropane tri(meth)acrylate, and trimethylolpropane di(meth)acrylate; (poly)alkylene glycol dimaleates such as triethylene glycol dimaleate and polyethylene glycol dimaleate;

unsaturated sulfonic acids, such as vinylsulfonate, (meth)allylsulfonate, 2-(meth)acryloxyethylsulfonate, 3-(meth)acryloxypropylsulfonate, 3-(meth)acryloxy-2-hydroxypropylsulfonate, 3-(meth)acryloxy-2-hydroxypropylsulfophenyl ether, 3-(meth)acryloxy-2-hydroxypropyloxysulfobenzoate, 4-(meth)acryloxybutylsulfonate, (meth)acrylamidomethylsulfonic acid, (meth)acrylamidoethylsulfonic acid, 2-methylpropanesulfonic acid (meth)acrylamide, and styrenesulfonic acid, and their monovalent metal salts, divalent metal salts, ammonium salts, and organic amine salts; unsaturated monocarboxylic acids, such as acrylic acid, methacrylic acid, and crotonic acid, and their metal salts, ammonium salts, and amine salts;

esters of unsaturated monocarboxylic acids with alcohols having 1 to 30 carbon atoms, such as methyl (meth)acrylate, ethyl (meth)acrylate, propyl (meth)acrylate, glycidyl (meth)acrylate, methyl crotonate, ethyl crotonate, and propyl crotonate; amides of unsaturated monocarboxylic acids with amines having 1 to 30 carbon atoms, such as methyl(meth)acrylamide; vinyl aromatic compounds such as styrene, α-methylstyrene, vinyltoluene, and p-methylstyrene; alkanediol mono(meth)acrylates such as 1,4-butanediol mono(meth)acrylate, 1,5-pentanediol mono(meth)acrylate, and 1,6-hexanediol mono(meth)acrylate; dienes such as butadiene, isoprene, 2-methyl-1,3-butadiene, and 2-chloro-1,3-butadiene; unsaturated amides such as (meth)acrylamide, (meth)acrylalkylamide, N-methylol(meth)acrylamide, and N,N-dimethyl(meth)acrylamide; unsaturated cyanes such as (meth)acrylonitrile and α-chloroacrylonitrile;

unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate, and vinylpyridine; divinyl aromatic compounds such as divinylbenzene; cyanurates such as triallyl cyanurate; allyl compounds such as (meth)allyl alcohol and glycidyl (meth)allyl ether; unsaturated amino compounds such as dimethylaminoethyl (meth)acrylate; vinyl ethers or allyl ethers, such as methoxypolyethylene glycol monovinyl ether, polyethylene glycol monovinyl ether, methoxypolyethylene glycol mono(meth)allyl ether, and polyethylene glycol mono(meth)allyl ether;

siloxane derivatives such as polydimethylsiloxanepropylaminomaleamic acid, polydimethylsiloxaneaminopropyleneaminomaleamic acid, polydimethylsiloxanebis(propylaminomaleamic acid), polydimethylsiloxanebis(dipropyleneaminomaleamic acid), polydimethylsiloxane-(1-propyl-3-acrylate), polydimethylsiloxane-(1-propyl-3-methacrylate), polydimethylsiloxanebis(1-propyl-3-acrylate), and polydimethylsiloxanebis(1-propyl-3-methacrylate); unsaturated phosphate esters such as 2-acryloyloxyethyl phosphate and 2-methacryloyloxyethyl phosphate; and nitrogen-atom-containing cationic monomers such as: compounds obtained by addition reactions of specific quantities of alkylene oxides to polyamidopolyamines obtained by further condensation of condensed products, for example, with (meth)acrylic acid, or with esterified products from (meth)acrylic acid and alcohols having 1 to 20 carbon atoms, or with unsaturated epoxy compounds (e.g. glycidyl (meth)acrylate, allyl glycidyl ether), in specific ratios, wherein the above condensed products are obtained by condensation between polyalkylenepolyamines (e.g. diethylenetriamine, triethylenetetramine, tetraethylenepentamine, pentaethylenehexamine, dipropylenetriamine, tripropylenetetramine, tetrapropylenepentamine) and dibasic acids or their esters with alcohols having 1 to 20 carbon atoms (e.g. malonic acid, succinic acid, fumaric acid, maleic acid, azelaic acid, sebacic acid, or their esters with alcohols having 1 to 20 carbon atoms); and condensed products obtained by condensation of compounds (obtained by addition reactions of alkylene oxides (e.g. ethylene oxide, propylene oxide) to active hydrogens of polyalkylenimines (e.g. polyethylenimine, polypropylenimine)) with (meth)acrylic acid, or with esterified products from (meth)acrylic acid and alcohols having 1 to 20 carbon atoms, or with unsaturated epoxy compounds (e.g. glycidyl (meth)acrylate, allyl glycidyl ether).

As to the weight-average molecular weight of the water-soluble polymer (P), it is important that the "area proportion" is in the specific range. The area proportion is defined by a measurement process including the following steps (1) to (9). An explanation is made while referring to FIG. 1.

(1) The step of measuring a weight-average molecular weight of the water-soluble polymer (P) by gel permeation chromatography (GPC). The measurement conditions of the GPC are as stated in the below-mentioned description of examples of some preferred embodiments.
(2) The step of detecting a height (H) of the top peak of the resultant GPC chart.
(3) The step of representing a value of a weight-average molecular weight indicating a height (½H) of ½ of the height of the top peak on the higher molecular weight side of the top peak by $M_A$. In the GPC chart of FIG. 1, the left side is the higher molecular weight side, and the right side is the lower molecular weight side, so there are two weight-average molecular weights indicating the height of ½H. Of them, however, the left side one is $M_A$.
(4) The step of measuring an area ($A_0$) of a higher molecular weight side portion than the weight-average molecular weight $M_A$ of the resultant GPC chart.
(5) The step of representing a value of a weight-average molecular weight indicating a height (½H) of ½ of the height of the top peak on the lower molecular weight side of the top peak by $M_B$. As is explained in (3) above, the right side is the lower molecular weight side in the GPC chart of FIG. 1, so the right side one of the two weight-average molecular weights indicating the height of ½H is $M_B$.
(6) The step of measuring an area ($B_0$) of a lower molecular weight side portion than the weight-average molecular weight $M_B$ of the resultant GPC chart.
(7) The step of defining an area ratio A of the higher molecular weight side portion as $A=(A_0 \times 100)/(A_0+B_0)$.
(8) The step of defining an area ratio B of the lower molecular weight side portion as $B=(B_0 \times 100)/(A_0+B_0)$.
(9) The step of defining a value (A−B), given by subtracting the area ratio B of the lower molecular weight side portion from the area ratio A of the higher molecular weight side portion, as the area proportion (%).

If the distribution of the weight-average molecular weight is of the bilaterally symmetrical shape as centered by the top peak like the normal distribution (namely, if the higher molecular weight side and the lower molecular weight side have the same shape), the values of A and B are equal, so the area proportion is 0%. In the case where the higher molecular weight side is contained more than the lower molecular weight side, A>B, so the area proportion indicates a positive value. Or otherwise in the case where the lower molecular weight side is contained more than the higher molecular weight side, A<B, so the area proportion indicates a negative value. The present inventors have found out that, in the case where higher molecular components are contained more than lower molecular ones to some degree, the initial dispersibility and the flow retainability of cement can be combined on high levels, thus having found out the optimum range of the area proportion. Specifically, in the present invention, the area proportion is importantly in the range of 13 to 60%, favorably 13 to 55%, more favorably 13 to 50%, still more favorably 13 to 45%, more particularly favorably 13 to 40%, most favorably 15 to 40%. In the case where the area proportion is less than 13%, higher molecular components are so insufficient that the flow retainability of cement is inferior. In the case where the area proportion is more than 60%, higher molecular weight components are too much and the molecular weight distribution is therefore so greatly inclined toward them that the initial dispersibility is inferior.

The proportion $A_1$ of the area of the higher molecular weight side portion to the total area (T) of the GPC chart ($A_1=(A_0 \times 100)/T$) is favorably not less than 15%, more favorably in the range of 15 to 30%. In the case where the proportion $A_1$ of the area of the higher molecular weight side portion is less than 15%, higher molecular components are so insufficient that the flow retainability of cement cannot be displayed enough. On the other hand, in the case where the proportion $A_1$ of the area is more than 30%, higher molecular components are too much, so the effect to make cement cohere is too strong, resulting in deterioration of the initial dispersibility.

The proportion $B_1$ of the area of the lower molecular weight side portion to the total area (T) of the GPC chart ($B_1=(B_0 \times 100)/T$) is favorably in the range of 5 to 20%, more favorably 5 to 15%. In the case where the proportion $B_1$ of the area of the lower molecular weight side portion is less than 5%, lower molecular components which contribute to dispersibility are so insufficient that the initial dispersibility is low. On the other hand, in the case where the proportion $B_1$ of the area is more than 20%, higher molecular components are so insufficient that the flow retainability of cement is low.

Although there is no especial limitation on the molecular weight of the water-soluble polymer (P) if it is such a molecular weight as displays the cement dispersibility, yet it favorably satisfies the weight-average molecular weight range of 5,000 to 1,000,000 (in terms of polyethylene glycol: GPC). In view of the dispersibility and flow retainability of cement, the weight-average molecular weight is favorably in the range of 20,000 to 300,000, more favorably 30,000 to 150,000.

Although there is no especial limitation on the process for producing the water-soluble polymer (P) if the above area proportion is obtained, yet by the production process according to the present invention, the water-soluble polymer (P) having the above area proportion can easily be obtained.

The production process according to the present invention comprises the step of polymerizing a monomer component, formable into the water-soluble polymer (P) by polymerization, in the presence of a polymerization initiator and/or a chain transfer agent, wherein the polymerizing step includes the steps of: a main-polymer production step of polymerizing a part of the monomer component, thereby producing a polymer (P1) constituting 60 to 99 mass % of the water-soluble polymer (P); and a step of producing a polymer for adjustment of higher molecular components, which is a step of polymerizing a part of the monomer component thereby producing a polymer (P2) constituting 1 to 40 mass % of the water-soluble polymer (P) and having a higher weight-average molecular weight than the polymer (P1) as obtained in the main-polymer production step.

In the main-polymer production step, the molecular weight distribution and weight-average molecular weight of the water-soluble polymer (P) are roughly determined by producing the polymer (P1) constituting the greater part (60 to 99 mass %, favorably 70 to 95 mass %) of the water-soluble polymer (P). On the other hand, in the step of producing a polymer for adjustment of higher molecular components, the higher molecular weight side of the molecular weight distribution of the water-soluble polymer (P) is finely adjusted by producing the polymer (P2) constituting 1 to 40 mass %, favorably 5 to 30 mass %, of the water-soluble polymer (P) and having a higher weight-average molecular weight than the polymer (P1).

The weight-average molecular weight of the polymer (P1) is favorably in the range of 5,000 to 1,000,000, more favorably 10,000 to 500,000. The weight-average molecular weight of the polymer (P2) is favorably not lower than 100,000, more favorably not lower than 150,000.

In the main-polymer production step, it is favorable to continuously dropwise add the following: not less than 20 mass %, more favorably not less than 50 mass %, still more favorably not less than 80 mass %, of the monomer component as used in this step; not less than 20 mass %, more favorably not less than 50 mass %, still more favorably not less than 80 mass %, of the polymerization initiator as used in this step if used in this step; and not less than 20 mass %, more favorably not less than 50 mass %, still more favorably not less than 80 mass %, of the chain transfer agent as used in this step if used in this step. If the monomer component, the polymerization initiator (if used), and the chain transfer agent (if used) are dropwise added, when compared with the case of being beforehand charged into a reactor, the polymerization can be prevented from going out of control, and a polymer having a homogeneous polymerization composition can be obtained.

In the step of producing a polymer for adjustment of higher molecular components, it is favorable to charge a reactor with not less than 20 mass %, more favorably not less than 50 mass %, still more favorably not less than 80 mass %, of the chain transfer agent as used in this step if used in this step, and to continuously dropwise add the following: not less than 20 mass %, more favorably not less than 50 mass %, still more favorably not less than 80 mass %, of the monomer component as used in this step; and not less than 20 mass %, more favorably not less than 50 mass %, still more favorably not less than 80 mass %, of the polymerization initiator as used in this step if used in this step. If the chain transfer agent (if used) is beforehand charged into the reactor, when compared with the case of being dropwise added, a high molecular polymer. can easily be obtained. In addition, if the monomer component and the polymerization initiator (if used) are dropwise added, when compared with the case of being beforehand charged into the reactor, the polymerization can be prevented from going out of control, and a polymer having a homogeneous polymerization composition can be obtained.

In the production process according to the present invention, the order of the main-polymer production step and the step of producing a polymer for adjustment of higher molecular components is not especially limited, but either one may be carried out prior to the other. Although there is no especial limitation on the method for determining the end point of the step as carried out prior to the other, for example, this method can be carried out in the following way. In comparison between weight-average molecular weights of the polymer obtained in the main-polymer production step and of that obtained in the step of producing a polymer for adjustment of higher molecular components, the weight-average molecular weight obtained in the step of producing a polymer for adjustment of the higher molecular components is higher and it is therefore often the case with this step that the mol % of the chain transfer agent (if used) relative to the monomer component is smaller. Thus, if there is utilized this difference between the mol % of the chain transfer agent relative to the monomer component in the main-polymer production step and that in the step of producing a polymer for adjustment of higher molecular components, then the point at which the quantity of the chain transfer agent has changed can be regarded as the end point of the step as carried out prior to the other.

The process for producing the water-soluble polymer (P) is not limited to the above production process according to the present invention, but, for example, there can be cited a process including the steps of: separately producing a polymer corresponding to the polymer (P1) and a polymer corresponding to the polymer (P2); and then blending them together.

As to the polymerization initiator usable in the present invention, in the case of carrying out aqueous solution polymerization, for example, there are favorably used the following water-soluble polymerization initiators: persulfates of ammonia or alkaline metals; hydrogen peroxide; and azoamidine compounds such as azobis(2-methylpropionamidine) hydrochloride. In such a case, promotors, such as sodium hydrogensulfite and L-ascorbic acid (its salts are also available), may be jointly used therewith. In addition, in the case where lower alcohols, aromatic or aliphatic hydrocarbons, ester compounds, or ketone compounds are used as solvents of the polymerization system, for example there are favorably used the following ones: peroxides such as benzoyl peroxide and lauroyl peroxide; hydroperoxides such as cumene hydroperoxide; and azo compounds such as azobisisobutyronitrile. In such a case, promotors such as amine compounds may be jointly used therewith. Furthermore, in the case where water-lower-alcohol-mixed solvents are used, it is favorable to use those which are fittingly selected from among the above various polymerization initiators or from among combinations thereof with the above promotors. In addition, in the case where bulk polymerization is carried out, for example, it is favorable to use, as the polymerization initiators, the following ones: peroxides such as benzoyl peroxide and lauroyl peroxide; hydroperoxides such as cumene hydroperoxide; and azo compounds such as azobisisobutyronitrile.

Thiol compounds are favorable as the chain transfer agent usable in the present invention. Examples thereof include already-known thiol compounds such as mercaptoethanol, thioglycerol, thioglycolic acid, 2-mercaptopropionic acid, 3-mercaptopropionic acid, thiomalic acid, octyl thioglycolate, octyl 3-mercaptopropionate, and 2-mercaptoethanesulfonic acid. These chain transfer agents may be used either alone respectively or in combinations with each other.

The water-soluble polymer (P) is, as it is, usable alone, or in the form of a mixture or aqueous solution, as the cement dispersant. In addition, the water-soluble polymer (P) may be used in combinations with other conventional cement admixtures. Examples of such conventional cement admixtures include conventional cement dispersants, air-entraining agents, cement humectants, swelling agents, waterproofing agents, retarders, accelerators, water-soluble high-molecular substances, thickeners, flocculants, dry-shrinkage-diminishing agents, strength-enhancing agents, curing promotors, and defoaming agents.

The cement dispersant according to the present invention can be used for hydraulic cements, such as portland cement, alumina cement, belite high-content cement, and various mixed cements, or hydraulic materials other than cement, such as gypsum.

When the cement dispersant according to the present invention is, for example, used for mortar or concrete containing the hydraulic cement, the cement dispersant may be added in the ratio of about 0.01 to about 5.0%, favorably about 0.02 to about 1.0%, relative to the cement mass. The addition in such a ratio brings about various favorable effects such as enhancement of slump retainability, reduction of unit quantity of water, increase of strength of concrete, and enhancement of durability of mortar or concrete. Addition of the cement dispersant in a quantity smaller than 0.01% is insufficient to the performance. Or otherwise, even if a quantity exceeding 5.0% is used, the resultant effects substantially reach the top and do not increase any more, so there are disadvantages also in an economical aspect.

Next, the cement composition, according to the present invention, at least comprises cement, water, and a cement dispersant, wherein the cement dispersant is the cement dispersant according to the present invention. It is favorable for the cement composition to contain the cement dispersant according to the present invention in the range of 0.01 to 5.0 mass parts, more favorably 0.02 to 1.0 mass part, per 100 mass parts (in terms of solid content) of the cement. Preparation of the cement composition by adding the cement dispersant in such a quantity as satisfies the above range brings about various favorable effects such as excellence in initial dispersibility and further in flow retainability of cement. Incidentally, the cement possible to combine into the cement composition is not especially limited, but, for example, there can be cited the hydraulic cements such as portland cement, alumina cement, belite high-content cement, and various mixed cements. In addition, fine aggregates and coarse aggregates, possible to combine into the cement composition, is not especially limited, either, but there can be used those which are fittingly selected from among many kinds of fine aggregates and coarse aggregates as are presently used. Fire-resistant aggregates such as silica stones, argillaceous, zircon, high-alumina, silicon carbide, graphite, chromium, chromium-magnesium, and magnesia are usable as other aggregates besides such as gravel, crushed stones, granulated slag, and regenerated aggregates.

The cement composition according to the present invention is not especially limited with regard to the unit quantity of water as used per 1 $m^3$ of the cement composition, the quantity of cement as used per 1 $m^3$ of the cement composition, and the water/cement ratio. However, for example, it is favorable that: the unit quantity of water is in the range of 100 to 185 kg/$m^3$, favorably 120 to 175 kg/$m^3$; the quantity of cement as used is in the range of 250 to 800 kg/$M^3$, favorably 270 to 800 kg/$m^3$; and the water/cement ratio (mass ratio) is in the range of 0.1 to 0.7, favorably 0.2 to 0.65. Thus, the cement composition according to the present invention is usable in the wide range from a poor to rich content, and is effective in all over the range from a high strength concrete with a large unit quantity of cement to a poor content concrete with a unit quantity of cement of not larger than 300 kg/$m^3$.

In addition, the cement dispersant according to the present invention is effective for such as concrete for secondary products of concrete, concrete for centrifugal molding, concrete for vibration puddling, concrete being vapor-aged, and concrete being sprayed, and further for mortar and concrete to which high flowability is demanded, such as high flow concrete, self-filling concrete, and self-leveling agents.

The cement composition according to the present invention is producible by a process for producing the cement composition including the step of mixing together raw production materials including the cement dispersant according to the present invention, cement, and water as essential components. Such a process for producing the cement composition is one of preferred modes for carrying out the present invention.

As an example of the above process for producing the cement composition, there is a process including the steps of: preparing the cement dispersant according to the present invention; and then dissolving it into water for knead-mixing necessary for the production of the cement composition; and then mixing them with cement. In addition, there is also a process including the step of beforehand mixing cement with the cement dispersant according to the present invention in the form of a powder. Furthermore, there is also a process including the steps of: separately dissolving the constituents of the cement dispersant according to the present invention into water for knead-mixing necessary for the production of the cement composition without beforehand preparing the cement dispersant; and then mixing them with cement. In the case of this process, examples thereof include: a process including the steps of: mixing water with the above water-soluble polymer; and then further mixing them with the above conventional cement dispersant and/or the above defoaming agent; and a process including the steps of: mixing water with the above conventional cement dispersant and/or the above defoaming agent; and then further mixing them with the above water-soluble polymer. Furthermore, there is also a process including the step of beforehand separately mixing cement with the above water-soluble polymer and the above defoaming agent both in the form of powders. Thus, as to the above process for producing the cement composition, as long as it involves the step of mixing all constituents of the cement dispersant according to the present invention, cement, and water together in such a manner that these raw production materials will be components of the resultant cement composition, there is no especial limitation with regard to such as method and order of adding each raw production material.

(Effects and Advantages of the Invention):

The cement dispersant according to the present invention is excellent in initial dispersibility and further in flow retainability of cement, because of comprising the polymer having the proper molecular weight distribution.

If the process for producing a cement dispersant, according to the present invention, is used, the polymer having the proper molecular weight distribution can be produced, so there can be obtained the cement dispersant which is excellent in initial dispersibility and further in flow retainability of cement.

The cement composition according to the present invention is excellent in initial dispersibility and further in flow retainability of cement, because of containing the cement dispersant according to the present invention.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples.

Unless otherwise noted, the units "part(s)" and "%", as hereinafter simply referred to, denote "mass part(s)" and "mass %" respectively.

Incidentally, the measurement conditions of the gel permeation chromatography (GPC) are as follows:

Columns used: one column each of the following products of TOSOH Corporation:

TSKguardcolumn α

TSKgel α-5000

TSKgel α-4000

TSKgel α-3000

Eluent used:
as prepared by dissolving 27.9 g of boric acid and 33.8 g of potassium chloride into a solution of 1,000.0 g of acetonitrile and 8,938.4 g of water and then adjusting the pH of the resultant solution to 9.0 with 30% NaOH.
Flow rate: 0.6 ml/minute
Column temperature: 40° C.
Detector: 410 Differential Refractive Index Detector, produced by Waters Co., Ltd.
Analytic software: MILLENNIUM 32 Ver. 3.06, produced by Waters Co., Ltd.
Standard substances used for drawing a calibration curve: polyethylene glycols
having the following Mp values: 860,000; 570,000; 272,500; 219,300; 107,000; 50,000; 24,000; 12,600; 7,100; 4,250; 1,470; 600; 150
Order of the calibration curve:
as drawn by a cubic equation with the above Mp values of the polyethylene glycols.

REFERENTIAL EXAMPLE 1 (PRODUCTION OF COMPARATIVE POLYMER 1)

First of all, 401.7 g of water was charged into a glass-made reactor as equipped with a thermometer, a stirrer, a dropper, a nitrogen-introducing tube and a reflux condenser. The internal air of the reactor was then replaced with nitrogen under stirring, and the reactor was then heated to 80° C. under the nitrogen atmosphere. Next, an aqueous monomer solution, as prepared by mixing 484.9 g of methoxypolyethylene glycol monomethacrylate (molar-number-average degree of addition polymerization of ethylene oxide: 25), 55.2 g of methacrylic acid, 3.3 g of 3-mercaptopropionic acid, and 134.1 g of water together, and 120 g of a 5.2 mass % aqueous ammonium persulfate solution were dropwise added into the reactor over periods of 4 hours and 5 hours respectively. Subsequently to the end of the dropwise addition of the aqueous ammonium persulfate solution, the internal temperature of the reactor was maintained at 80° C. for another 1 hour to complete the polymerization reaction. Thereafter, the resultant reaction mixture was neutralized with a 30% aqueous sodium hydroxide solution so as to have pH 7.0, thus obtaining the comparative polymer 1.

REFERENTIAL EXAMPLE 2 (PRODUCTION OF POLYMER 1)

First of all, 401.7 g of water and 0.07 g of 3-mercaptopropionic acid were charged into a glass-made reactor as equipped with a thermometer, a stirrer, a dropper, a nitrogen-introducing tube and a reflux condenser. The internal air of the reactor. was then replaced with nitrogen under stirring, and the reactor was then heated to 80° C. under the nitrogen atmosphere. Next, an aqueous monomer solution, as prepared by mixing 60.6 g of methoxypolyethylene glycol monomethacrylate (molar-number-average degree of addition polymerization of ethylene oxide: 25), 6.9 g of methacrylic acid, and 17 g of water together, and 12 g of a 5.2 mass % aqueous ammonium persulfate solution were dropwise added into the reactor over a period of 0.5 hour. Subsequently to the end of this dropwise addition, an aqueous monomer solution, as prepared by mixing 424.3 g of methoxypolyethylene glycol monomethacrylate (molar-number-average degree of addition polymerization of ethylene oxide: 25), 48.3 g of methacrylic acid, 2.9 g of 3-mercaptopropionic acid, and 118.2 g of water together, and 108 g of a 5.2% aqueous ammonium persulfate solution were further dropwise added into the reactor over periods of 4 hours and 5 hours respectively. Subsequently to the end of the dropwise addition of the aqueous ammonium persulfate solution, the internal temperature of the reactor was maintained at 80° C. for another 1 hour to complete the polymerization reaction. Thereafter, the resultant reaction mixture was neutralized with a 30% aqueous sodium hydroxide solution so as to have pH 7.0, thus obtaining the polymer 1 for producing a cement dispersant according to the present invention.

REFERENTIAL EXAMPLE 3 (PRODUCTION OF POLYMER 2)

First of all, 401.7 g of water and 0.14 g of 3-mercaptopropionic acid were charged into a glass-made reactor as equipped with a thermometer, a stirrer, a dropper, a nitrogen-introducing tube and a reflux condenser. The internal air of the reactor was then replaced with nitrogen under stirring, and the reactor was then heated to 80° C. under the nitrogen atmosphere. Next, an aqueous monomer solution, as prepared by mixing 60.6 g of methoxypolyethylene glycol monomethacrylate (molar-number-average degree of addition polymerization of ethylene oxide: 25), 6.9 g of methacrylic acid, and 17 g of water together, and 12 g of a 5.2 mass % aqueous ammonium persulfate solution were dropwise added into the reactor over a period of 0.5 hour. Subsequently to the end of this dropwise addition, an aqueous monomer solution, as prepared by mixing 424.3 g of methoxypolyethylene glycol monomethacrylate (molar-number-average degree of addition polymerization of ethylene oxide: 25), 48.3 g of methacrylic acid, 3.2 g of 3-mercaptopropionic acid, and 118.2 g of water together, and 108 g of a 5.2% aqueous ammonium persulfate solution were further dropwise added into the reactor over periods of 4 hours and 5 hours respectively. Subsequently to the end of the dropwise addition of the aqueous ammonium persulfate solution, the internal temperature of the reactor was maintained at 80° C. for another 1 hour to complete the polymerization reaction. Thereafter, the resultant reaction mixture was neutralized with a 30% aqueous sodium hydroxide solution so as to have pH 7.0, thus obtaining the polymer 2 for producing a cement dispersant according to the present invention.

REFERENTIAL EXAMPLE 4 (PRODUCTION OF POLYMER 3)

First of all, 401.7 g of water and 0.14 g of 3-mercaptopropionic acid were charged into a glass-made reactor as equipped with a thermometer, a stirrer, a dropper, a nitrogen-introducing tube and a reflux condenser. The internal air of the reactor was then replaced with nitrogen under stirring, and the reactor was then heated to 80° C. under the nitrogen atmosphere. Next, an aqueous monomer solution, as prepared by mixing 60.6 g of methoxypolyethylene glycol monomethacrylate (molar-number-average degree of addition polymerization of ethylene oxide: 25), 6.9 g of methacrylic acid, and 17 g of water together, and 12 g of a 5.2 mass % aqueous ammonium persulfate solution were dropwise added into the reactor over a period of 0.5 hour. Subsequently to the end of this dropwise addition, an aqueous monomer solution, as prepared by mixing 424.3 g of methoxypolyethylene glycol monomethacrylate (molar-number-average degree of addition polymerization of ethylene oxide: 25), 48.3 g of methacrylic acid, 2.8 g of 3-mercaptopropionic acid, and 118.2 g of water together, and 108 g of a 5.2% aqueous ammonium persulfate solution were further dropwise added into the reactor over periods of 4 hours and 5 hours respectively. Subsequently to the end of the dropwise addition of the aqueous ammonium persulfate solution, the internal temperature of the reactor was maintained at 80° C. for another 1 hour to complete the polymerization reaction. Thereafter, the resultant reaction mixture was neutralized with a 30% aqueous sodium hydroxide solution so as to have pH 7.0, thus obtaining the polymer 3 for producing a cement dispersant according to the present invention.

REFERENTIAL EXAMPLE 5 (PRODUCTION OF COMPARATIVE POLYMER 2)

First of all, 400.5 g of water was charged into a glass-made reactor as equipped with a thermometer, a stirrer, a dropper, a nitrogen-introducing tube and a reflux condenser. The internal air of the reactor was then replaced with nitrogen under stirring, and the reactor was then heated to 80° C. under the nitrogen atmosphere. Next, an aqueous monomer solution, as prepared by mixing 450.4 g of methoxypolyethylene glycol monomethacrylate (molar-number-average degree of addition polymerization of ethylene oxide: 25), 89.7 g of methacrylic acid, 4:2 g of 3-mercaptopropionic acid, and 133.6 g of water together, and 120 g of a 5.2 mass % aqueous ammonium persulfate solution were dropwise added into the reactor over periods of 4 hours and 5 hours respectively. Subsequently to the end of the dropwise addition of the aqueous ammonium persulfate solution, the internal temperature of the reactor was maintained at 80° C. for another 1 hour to complete the polymerization reaction. Thereafter, the resultant reaction mixture was neutralized with a 30% aqueous sodium hydroxide solution so as to have pH 7.0, thus obtaining the comparative polymer 2.

REFERENTIAL EXAMPLE 6 (PRODUCTION OF POLYMER 4)

First of all, 400.5 g of water and 0.1 g of 3-mercaptopropionic acid were charged into a glass-made reactor as equipped with a thermometer, a stirrer, a dropper, a nitrogen-introducing tube and a reflux condenser. The internal air of the reactor was then replaced with nitrogen under stirring, and the reactor was then heated to 80° C. under the nitrogen atmosphere. Next, an aqueous monomer solution, as prepared by mixing 56.3 g of methoxypolyethylene glycol monomethacrylate (molar-number-average degree of addition polymerization of ethylene oxide: 25), 11.2 g of methacrylic acid, and 17 g of water together, and 12 g of a 5.2 mass % aqueous ammonium persulfate solution were dropwise added into the reactor over a period of 0.5 hour. Subsequently to the end of this dropwise addition, an aqueous monomer solution, as prepared by mixing 394.1 g of methoxypolyethylene glycol monomethacrylate (molar-number-average degree of addition polymerization of ethylene oxide: 25), 78.5 g of methacrylic acid, 3.7 g of 3-mercaptopropionic acid, and 118.2 g of water together, and 108 g of a 5.2% aqueous ammonium persulfate solution were further dropwise added into the reactor over periods of 4 hours and 5 hours respectively. Subsequently to the end of the dropwise addition of the aqueous ammonium persulfate solution, the internal temperature of the reactor was maintained at 80° C. for another 1 hour to complete the polymerization reaction. Thereafter, the resultant reaction mixture was neutralized with a 30% aqueous sodium hydroxide solution so as to have pH 7.0, thus obtaining the polymer 4 for producing a cement dispersant according to the present invention.

REFERENTIAL EXAMPLE 7 (PRODUCTION OF POLYMER 5)

First of all, 400.5 g of water and 0.2 g of 3-mercaptopropionic acid were charged into a glass-made reactor as equipped with a thermometer, a stirrer, a dropper, a nitrogen-introducing tube and a reflux condenser. The internal air of the reactor was then replaced with nitrogen under stirring, and the reactor was then heated to 80° C. under the nitrogen atmosphere. Next, an aqueous monomer solution, as prepared by mixing 56.3 g of methoxypolyethylene glycol monomethacrylate (molar-number-average degree of addition polymerization of ethylene oxide: 25), 11.2 g of methacrylic acid. and 17 g of water together, and 12 g of a 5.2 mass % aqueous ammonium persulfate solution were dropwise added into the reactor over a period of 0.5 hour. Subsequently to the end of this dropwise addition, an aqueous monomer solution, as prepared by mixing 394.1 g of methoxypolyethylene glycol monomethacrylate (molar-number-average degree of addition polymerization of ethylene oxide: 25), 78.5 g of methacrylic acid, 3.7 g of 3-mercaptopropionic acid, and 118.2 g of water together, and 108 g of a 5.2% aqueous ammonium persulfate solution were further dropwise added into the reactor over periods of 4 hours and 5 hours respectively. Subsequently to the end of the dropwise addition of the aqueous ammonium persulfate solution, the internal temperature of the reactor was maintained at 80° C. for another 1 hour to complete the polymerization reaction. Thereafter, the resultant reaction mixture was neutralized-with a 30% aqueous sodium hydroxide solution so as to have pH 7.0, thus obtaining the polymer 5 for producing a cement dispersant according to the present invention.

REFERENTIAL EXAMPLE 8 (PRODUCTION OF POLYMER 6)

First of all, 400.5 g of water and 0.15 g of 3-mercaptopropionic acid were charged into a glass-made reactor as equipped with a thermometer, a stirrer, a dropper, a nitrogen-introducing tube and a reflux condenser. The internal air of the reactor was then replaced with nitrogen under stirring, and the reactor was then heated to 80° C. under the nitrogen atmosphere. Next, an aqueous monomer solution, as prepared by mixing 56.3 g of methoxypolyethylene glycol monomethacrylate (molar-number-average degree of addition polymerization of ethylene oxide: 25), 11.2 g of methacrylic acid, and 17 g of water together, and 12 g of a 5.2 mass % aqueous ammonium persulfate solution were dropwise added into the reactor over a period of 0.5 hour. Subsequently to the end of this dropwise addition, an aqueous monomer solution, as prepared by mixing 394.1 g of methoxypolyethylene glycol monomethacrylate (molar-number-average degree of addition polymerization of ethylene oxide: 25), 78.5 g of methacrylic acid, 3.9 g of 3-mercaptopropionic acid, and 118.2 g of water together, and 108 g of a 5.2% aqueous ammonium persulfate solution were further dropwise added into the reactor over periods of 4 hours and 5 hours respectively. Subsequently to the end of the dropwise addition of the aqueous ammonium persulfate solution, the internal temperature of the reactor was maintained at 80° C. for another 1 hour to complete the polymerization reaction. Thereafter, the resultant reaction mixture was neutralized with a 30% aqueous sodium hydroxide solution so as to have pH 7.0, thus obtaining the polymer 6 for producing a cement dispersant according to the present invention.

EXAMPLES 1 TO 6 AND COMPARATIVE EXAMPLES 1 TO 2

The polymers, as produced in the above Referential Examples 1 to 8, were used as cement dispersants to produce mortars in the following way. Then, the resultant mortars were measured by the flow value and the quantity of air. Their results are shown in Table 2. Also shown in Table 1 are the following properties of the polymers as produced in the above Referential Examples 1 to 8: weight-average molecular weight; area ratio A of higher molecular weight side portion; area ratio B of lower molecular weight side portion; area proportion; proportion $A_1$ of area of higher molecular weight side portion; proportion $B_1$ of area of lower molecular weight side portion; and weight-average molecular weight of polymer for adjustment of higher molecular components.

Quantities of Materials (Agents) Used:
Normal portland cement produced by Pacific Cement Co., Ltd.: 600 g
Toyoura standard sand.: 600 g
Water: 210 g
Polymer (cement dispersant) :0.2 or 0.25 mass %/cement mass (shown in Table 2)

Preparation of Mortar:
The mortar was prepared by kneading 600 g of normal portland cement (produced by Pacific Cement Co., Ltd.) and 600 g of Toyoura standard sand without water at a low speed for 30 seconds, and then adding a mixture of the polymer and 210 g of water to the above-kneaded cement-sand mixture, and then kneading them at a high revolution rate for 5 minutes, wherein the kneading was carried out with a mortar mixer (produced by HOBART Corporation).

Measurement of Flow Value:
The prepared mortar was filled into a hollow cylindrical container of 55 mm in inner diameter and 50 mm in height as placed on a horizontal table. Next, after lifting this hollow cylindrical container in perpendicular, the diameters of the mortar as spread on the table were measured in two directions lengthwise and breadthwise, and the average value thereof was regarded as the flow value.

Measurement of Quantity of Air:
The mass of 500 ml in volume of the prepared mortar was measured to calculate the quantity of entrained air from the specific gravities of the materials used.

TABLE 1

| Referential Example | Polymer | Weight-average molecular weight | Area ratio A (%) of higher molecular weight side portion | Area ratio B (%) of lower molecular weight side portion | Area proportion (A − B) (%) | Proportion $A_1$ (%) of area of higher molecular weight side portion | Proportion $B_1$ (%) of area of lower molecular weight side portion | Weight-average molecular weight of polymer for adjustment of higher molecular components ($A_0$ portion) |
|---|---|---|---|---|---|---|---|---|
| 1 | Comparative polymer 1 | 38,400 | 54 | 47 | 7 | 13 | 11 | 92,300 |
| 2 | Polymer 1 | 43,100 | 69 | 32 | 37 | 18 | 8 | 110,400 |
| 3 | Polymer 2 | 38,500 | 67 | 33 | 34 | 19 | 9 | 115,000 |
| 4 | Polymer 3 | 41,700 | 63 | 37 | 26 | 14 | 8 | 104,600 |
| 5 | Comparative polymer 2 | 49,300 | 54 | 47 | 7 | 12 | 10 | 121,500 |
| 6 | Polymer 4 | 51,200 | 60 | 40 | 20 | 14 | 9 | 126,300 |
| 7 | Polymer 5 | 49,800 | 58 | 42 | 16 | 13 | 10 | 128,000 |
| 8 | Polymer 6 | 52,300 | 57 | 44 | 13 | 13 | 10 | 139,300 |

TABLE 2

| Example/ Comparative Example | Polymer | Area proportion (%) | Quantity of addition (mass %) | Flow value (mm) after 5 minutes | Flow value (mm) after 60 minutes | (Flow value after 60 minutes) − (flow value after 5 minutes) (mm) | Quantity of air (%) after 5 minutes |
|---|---|---|---|---|---|---|---|
| Comparative Example 1 | Comparative polymer 1 of Referential Example 1 | 7 | 0.25 | 150 | 120 | −30 | 17.5 |
| Example 1 | Polymer 1 of Referential Example 2 | 37 | 0.25 | 162 | 142 | −20 | 17.5 |
| Example 2 | Polymer 2 of Referential Example 3 | 34 | 0.25 | 156 | 140 | −16 | 17.2 |
| Example 3 | Polymer 3 of Referential Example 4 | 26 | 0.25 | 155 | 136 | −19 | 17.3 |
| Comparative Example 2 | Comparative polymer 2 of Referential Example 5 | 7 | 0.2 | 160 | 110 | −50 | 15.3 |

TABLE 2-continued

| Example/Comparative Example | Polymer | Area proportion (%) | Quantity of addition (mass %) | Flow value (mm) after 5 minutes | Flow value (mm) after 60 minutes | (Flow value after 60 minutes) − (flow value after 5 minutes) (mm) | Quantity of air (%) after 5 minutes |
|---|---|---|---|---|---|---|---|
| Example 4 | Polymer 4 of Referential Example 6 | 20 | 0.2 | 156 | 135 | −21 | 16.0 |
| Example 5 | Polymer 5 of Referential Example 7 | 16 | 0.2 | 155 | 133 | −22 | 16.2 |
| Example 6 | Polymer 6 of Referential Example 8 | 13 | 0.2 | 153 | 130 | −23 | 15.6 |

From the results of Tables 1 and 2, it would be understood as follows. As to Comparative Example 1 in which the polymer displaying an area proportion of 7% was used, the difference between the flow value after 60 minutes and that after 5 minutes is −30 mm, whereas, as to Examples 1 to 3 in which the polymers displaying an area proportion in the range of 26 to 37% were used, the differences between the flow value after 60 minutes and that after 5 minutes are in the range of −16 to −20 mm, therefore the deterioration of the flow value is suppressed. Similarly, it would be understood as follows. As to Comparative Example 2 in which the polymer displaying an area proportion of 7% was used, the difference between the flow value after 60 minutes and that after 5 minutes is −50 mm, whereas, as to Examples 4 to 6 in which the polymers displaying an area proportion in the range of 13 to 20% were used, the differences between the flow value after 60 minutes and that after 5 minutes are in the range of −21 to −23 mm, therefore the deterioration of the flow value is very much suppressed.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for producing a cement dispersant, which is a process for producing a cement dispersant including a water-soluble polymer (P) as a main component,
with the process comprising the step of polymerizing a monomer component to produce the water-soluble polymer (P) by polymerization, in the presence of a chain transfer agent,
wherein the step of polymerizing includes the steps of:
a step of polymerizing a monomer part (M1) of the monomer component, thereby producing polymer units (P1) constituting 60 to 99 mass % of the water-soluble polymer (P), wherein said step of producing polymer units (P1) is carried out by using a fraction (F1) of the chain transfer agent, wherein said fraction (F1) is not less than 80 mass % of the total amount of the chain transfer agent; and
a step of polymerizing a monomer part (M2) of the monomer component, thereby producing polymer units (P2) constituting 1 to 40 mass % of the water-soluble polymer (P), wherein said step of producing polymer units (P2) is carried out by using a fraction (F2) of the chain transfer agent, wherein polymer units (P2) have a higher weight-average molecular weight than polymer units (P1), wherein the step of producing polymer units (P2) is carried out before the step of producing polymer units (P1), and wherein the step of producing polymer units (P2) is carried out by beforehand charging a reactor with the fraction (F2) of the chain transfer agent and no monomer part (M2), and after the reactor is charged, incrementally adding over a period of time the monomer part (M2) to the reactor.

2. A process according to claim 1, wherein the step of producing polymer units (P1) is carried out by continuously dropwise adding not less than 20 mass % of the monomer component as used in this step, not less than 20 mass % of a polymerization initiator as used in this step if used in this step, and not less than 20 mass % of the chain transfer agent as used in this step.

3. A process according to claim 1, wherein the step of producing polymer units (P2) is carried out by charging a reactor with not less than 20 mass % of the chain transfer agent as used in this step, and continuously dropwise adding not less than 20 mass % of the monomer component as used in this step and not less than 20 mass % of a polymerization initiator as used in this step if used in this step.

4. A process according to claim 2, wherein the step of producing polymer units (P2) is carried out by charging a reactor with not less than 20 mass % of the chain transfer agent as used in this step, and continuously dropwise adding not less than 20 mass % of the monomer component as used in this step and not less than 20 mass % of a polymerization initiator as used in this step if used in this step.

5. A process according to claim 1, wherein the monomer component includes an unsaturated carboxylic monomer.

6. A process according to claim 5, wherein the unsaturated carboxylic monomer is at least one member selected from the group consisting of (meth)acrylic acid and their salts.

7. A process according to claim 1, wherein the monomer component includes:
a monomer (a) to give a constitutional unit (I) of the following general formula (1):

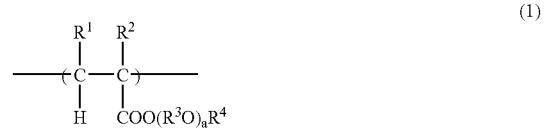

wherein: $R^1$ and $R^2$, being identical with or different from each other, represent a hydrogen atom or a methyl group; $R^3O$, being identical with or different from each other, represents an oxyalkylene group having 2 to 18 carbon atoms; "a" represents a molar-number-average degree of addition polymerization of the oxyalkylene group and is a number of 2 to 300; and $R^4$ represents a hydrogen atom or a hydrocarbon group having 1 to 30 carbon atoms; and a monomer (b) to give a constitutional unit (II) of the following general formula (2):

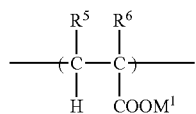

(2)

wherein: $R^5$ and $R^6$, being identical with or different from each other, represent a hydrogen atom or methyl group; and $M^1$ represents a hydrogen atom, a monovalent metal, a divalent metal, ammonium, or an organic amine.

8. A process according to claim 7, wherein the monomer (a) is at least one of compounds obtained by esterification of alkoxypolyalkylene glycols with (meth)acrylic acid or crotonic acid.

9. A process according to claim 7, wherein the monomer (b) is at least one member selected from the group consisting of (meth)acrylic acid and their salts.

* * * * *